United States Patent
Huang et al.

(10) Patent No.: US 12,470,053 B2
(45) Date of Patent: Nov. 11, 2025

(54) WIRE TERMINAL PROTECTOR, INSTALLATION COMPONENT, AND HOUSEHOLD COOKING APPLIANCE

(71) Applicant: SHENZHEN CHENBEI TECHNOLOGY CO., LTD., Shenzhen (CN)

(72) Inventors: Zhipeng Huang, Shenzhen (CN); Weihao Gu, Shenzhen (CN); Min Lin, Shenzhen (CN)

(73) Assignee: SHENZHEN CHENBEI TECHNOLOGY CO., LTD., Shenzhen (CN)

( * ) Notice: Subject to any disclaimer, the term of this patent is extended or adjusted under 35 U.S.C. 154(b) by 127 days.

(21) Appl. No.: 18/487,612

(22) Filed: Oct. 16, 2023

(65) Prior Publication Data

US 2024/0128735 A1  Apr. 18, 2024

(30) Foreign Application Priority Data

Oct. 17, 2022  (CN) .......................... 202222732393.8

(51) Int. Cl.
  *H02G 15/04* (2006.01)
  *A47J 36/00* (2006.01)
  *H01B 17/56* (2006.01)

(52) U.S. Cl.
  CPC .............. *H02G 15/04* (2013.01); *A47J 36/00* (2013.01); *H01B 17/56* (2013.01)

(58) Field of Classification Search
  CPC ....... H02G 15/04; H02G 15/113; H02G 15/23
  USPC .................................................. 174/92, 74 R
  See application file for complete search history.

(56) References Cited

U.S. PATENT DOCUMENTS

| | | | | |
|---|---|---|---|---|
| 3,354,454 A | * | 11/1967 | Rueger | F21S 8/00 174/559 |
| 3,624,270 A | * | 11/1971 | Turner | H01R 4/22 439/586 |
| 3,683,314 A | * | 8/1972 | Elkins | H01R 13/639 174/59 |
| 5,191,172 A | * | 3/1993 | Garganese | H02G 15/043 174/74 A |
| 5,796,041 A | * | 8/1998 | Suzuki | H02G 15/18 174/92 |
| 7,232,953 B2 | * | 6/2007 | Torii | H01R 4/22 174/76 |

* cited by examiner

*Primary Examiner* — Chau N Nguyen
(74) *Attorney, Agent, or Firm* — Bayramoglu Law Offices LLC

(57) ABSTRACT

A wire terminal protector, an assembly component, and a household cooking appliance are provided. The wire terminal protector includes a first component and a second component. The first component and the second component are assembled to form an enclosed space. One or both of the first component and the second component are provided with a first through-hole that connects the enclosed space to an outside. A wire terminal is accommodated in the enclosed space, and the first through-hole is configured for insertion of a wire into the enclosed space.

17 Claims, 4 Drawing Sheets

WIRE TERMINAL PROTECTOR, INSTALLATION COMPONENT, AND HOUSEHOLD COOKING APPLIANCE

CROSS-REFERENCE TO RELATED APPLICATION

This application claims the priority of Chinese patent application No. 202222732393.8, filed on Oct. 17, 2022, the entirety of which is incorporated herein by reference.

FIELD

The present disclosure generally relates to the field of household appliance and, more particularly, relates to a wire terminal protector, an installation component, and a household cooking appliance.

BACKGROUND

A closed-end terminal is a commonly used electrical connecting component in a small household appliance, and uses a fiberglass sleeve as a protector. However, both the silicone gel inside the fiberglass sleeve and the plastic casing of the closed-end terminal are flammable materials that can ignite and burn other plastic components of the product, such as the casing, under a high temperature. The plastic materials are highly flammable, leading to the ignition of the entire product. Meanwhile, the connecting method using the closed-end terminal has a certain probability of connection failure. When the connection between two wires fails, it is highly likely to result in arc discharges, which generates a high temperature at the connection point and ignites flammable materials. In a scenario of intense combustion, the copper ring inside the closed-end terminal will be melted, and the molten copper ball can burn through the fiberglass sleeve and instantly ignite other plastic components of the product, thereby leading to a fire.

SUMMARY

One aspect of the present disclosure provides a wire terminal protector. The wire terminal protector includes a first component and a second component. The first component and the second component are assembled to form an enclosed space. One or both of the first component and the second component are provided with a first through-hole that connects the enclosed space to an outside. A wire terminal is accommodated in the enclosed space, and the first through-hole is configured for insertion of a wire into the enclosed space.

Another aspect of the present disclosure provides an assembly component. The assembly component includes a wire terminal protector. The wire terminal protector includes a first component and a second component. The first component and the second component are assembled to form an enclosed space. One or both of the first component and the second component are provided with a first through-hole that connects the enclosed space to an outside. A wire terminal is accommodated in the enclosed space, and the first through-hole is configured for insertion of a wire into the enclosed space. The wire terminal protector also includes a protrusion. The protrusion is located on an outer surface of one or both of the first component and the second component. The assembly component also includes a bracket. The bracket includes a clamping hole, and the protrusion is locked into the clamping hole.

Another aspect of the present disclosure provides a household cooking appliance. The household cooking appliance includes an assembly component. The assembly component includes a wire terminal protector. The wire terminal protector includes a first component and a second component. The first component and the second component are assembled to form an enclosed space. One or both of the first component and the second component are provided with a first through-hole that connects the enclosed space to an outside. A wire terminal is accommodated in the enclosed space, and the first through-hole is configured for insertion of a wire into the enclosed space. The wire terminal protector also includes a protrusion. The protrusion is located on an outer surface of one or both of the first component and the second component. The assembly component also includes a bracket. The bracket includes a clamping hole, and the protrusion is locked into the clamping hole.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Figure 1:
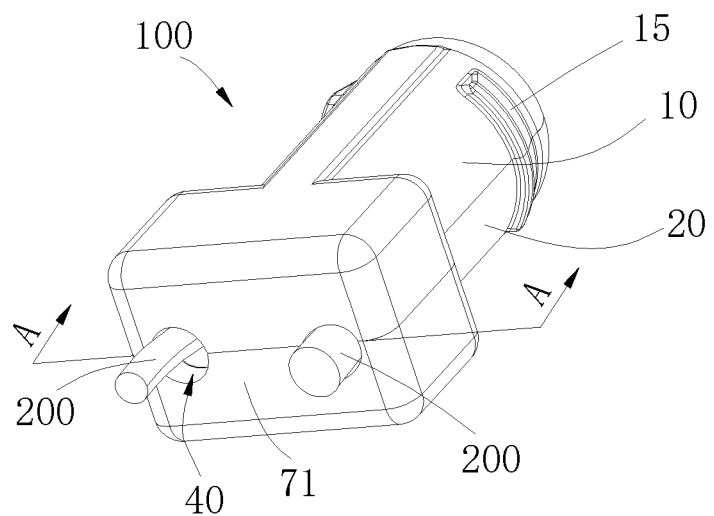
FIG. 1 illustrates a schematic diagram of an exemplary assembly of a wire terminal protector, a wire and a terminal consistent with disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Various modifications and changes can be made to the embodiments of the present disclosure without departing from the spirit or scope of the present disclosure, which is apparent to those skilled in the art. Therefore, the present disclosure is intended to cover modifications and changes falling within the scope of the corresponding claims (the technical solutions to be protected) and their equivalents. It should be noted that the embodiments provided by the present disclosure can be combined with each other without contradiction.

Similar reference numbers and letters represent similar terms in the following Figures, such that once an item is defined in one Figure, it does not need to be further discussed in subsequent Figures.

In the description of the present disclosure, it should be understood that terms indicating orientations or positional relationships, such as "center", "longitudinal", "transverse", "length", "width", "thickness", "up", "down", "front", "back", "left", "right", "vertical", "horizontal", "top", "bottom", "inner", "outer", "clockwise", "counterclockwise", etc., may be based on the orientations or positional relationships shown in the accompanying drawings. These terms may be used for the convenience of describing the present disclosure and simplifying the description, and may not indicate or imply that the devices or components referred to must have specific orientations, be constructed and operated in specific orientations. Therefore, such terms should not be interpreted as limitations of the present disclosure. Furthermore, terms such as "first" and "second" may be merely used for descriptive purposes and should not be interpreted as indicating relative importance or implying a specific quantity of indicated technical features. Therefore, features labeled as "first" or "second" may explicitly or implicitly include one or more of those features. In the description of the present disclosure, the terms "multiple" or "a plurality of" may mean two or more, unless otherwise explicitly specified.

In the description of the present disclosure, it should be clarified that unless specifically stated and defined otherwise, terms such as "install", "connect", and "joint" should be broadly interpreted. For example, the terms may refer to a fixed connection, a detachable connection, or an integral connection; may be a mechanical connection, an electrical connection, or a communicative connection; may be a direct connection, or an indirect connection through intermediary elements; and may represent interconnection between the two elements or interaction between the two elements. For the ordinary skilled in the art, the specific meanings of these terms in the context of the present disclosure may be understood based on specific circumstances.

In the present disclosure, unless specifically stated and defined otherwise, the term "above" or "below" with reference to the first feature relative to the second feature may include direct contact between the first and second features or indirect contact between them through additional features. Additionally, the first feature being "above", "over", and "on top" of the second feature may indicate the first feature is directly above or diagonally above the second feature, or may merely indicate that the first feature is at a higher horizontal level than the second feature. The first feature being "below", "under", and "beneath" the second feature may indicate the first feature is directly below or diagonally below the second feature, or may merely indicate that the first feature is at a lower horizontal level than the second feature.

The following disclosure provides numerous different embodiments or examples for implementing various structures of the present disclosure. To simplify the present disclosure, specific components and configurations of specific examples are described. However, these descriptions are merely provided for illustrative purposes and are not intended to limit the present disclosure. Additionally, references to specific numbers and/or letters may be repeated across different examples for the purpose of clarity and simplification, without implying relationships between various embodiments and/or configurations being discussed. Furthermore, specific examples of processes and materials are provided, but those skilled in the art may recognize the application of other processes and/or the use of other materials.

Figure 2:
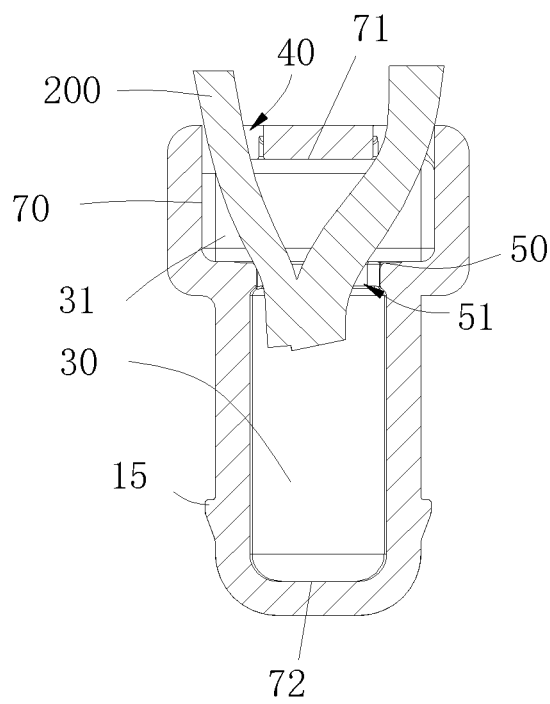
FIG. 2 illustrates an A-A sectional view of the assembly structure in FIG. 1 consistent with disclosed embodiments of the present disclosure.

The present disclosure provides a wire terminal protector. Referring to FIG. 1 and FIG. 2, the disclosed wire terminal protector 100 may include a first component 10 and a second component 20. The first component 10 and the second component 20 may be assembled to form an enclosed space 30. One or both of the first component 10 and the second component 20 may be provided with a first through-hole 40 that connects the enclosed space 30 to an outside. A wire terminal may be accommodated in the enclosed space, and the first through-hole 40 may be configured for the insertion of a wire 200 into the enclosed space 30. The outside may refer to an outside of the circumferential wall 70 forming the enclosed space. A partition 50 may be provided in the enclosed space 30, and the partition 50 may be provided with a second through-hole 51. A diameter of the second through-hole 51 may be greater than a diameter of the first through-hole 40, and a quantity of the second through-holes 51 may be smaller than a quantity of the first through-holes 40.

In the disclosed wire terminal protector 100, a terminal 300 (also referring to FIG. 3) may be directly accommodated within the enclosed space 30 formed by the first component 10 and the second component 20. Therefore, the existing structural design of the terminal 300 may not need to be modified. The first through-hole 40 and the second through-hole 51 may be configured to place the wire 200. Hollow space may exist between the wires 200 led out from the terminal 300, and a sealed region may be created within such hollow space. When a combustion event occurs at the terminal 300, the presence of the first through-hole 40 and the second through-hole 51 may confine the flame inside the wire terminal protector 100, which may effectively prevent the expansion of the burning region and may avoid the occurrence of a fire.

In one embodiment, the first component 10 and the second component 20 may be assembled vertically or horizontally. The present disclosure may not limit the specific manner of assembly between the first component 10 and the second component 20.

The size of the enclosed space 30 may be determined by the dimensions of the first component 10 and the second component 20, allowing the wire 200 and the terminal 300 to be accommodated within the enclosed space 30. The enclosed space 30 may include a buffer space 31, and the wire 200 may be at least partially located in the buffer space 31. It should be understood that when the terminal 300 burns, the flame may spread to the wire 200. The disposure of a portion of the wire 200 in the buffer space 31 may separate the fire region of the terminal 300 from the fire region of the wire 200. The combustion medium of the wire 200 may be less than the combustion medium of the terminal 300. Therefore, with respect to the terminal 300, the wire 200 may end the burning state prematurely. Consequently, the buffer space 31 may buffer the flames produced during the combustion of the terminal 300. Because there is no gap or is a minimal gap between the wire 200 and the first through-hole 40, the disposure of the buffer space 31 may prevent the external oxygen from entering the enclosed space, which may reduce the probability of combustion occurring in components outside the wire terminal protector 100.

In one embodiment, a sealing adhesive may be applied at the location of the first through-hole 40. Furthermore, after assembling the terminal 300 and the wire 200 into the wire terminal protector 100, the sealing adhesive may be applied in the gap formed between the first through-hole 40 and the wire 200. The sealing adhesive may be made of a flame-retardant and high-temperature resistant material. The present disclosure may not limit the specific type of the sealing adhesive, and the sealing adhesive may prevent the flame from spreading to the exterior of the wire terminal protector 100 through the gap between the wire 200 and the first through-hole 40.

The first through-hole 40 may be formed by the assembly of the first component 10 and the second component 20. The quantity of first through-holes 40 may be depended on the quantity of wires 200, and each one first through-hole 40 may correspond to one wire 200. The first through-hole 40 may have a circular shape, a square shape, or a diamond shape, etc., which may not be limited by the present disclosure.

The partition 50 may include a thin-wall structure with a certain thickness, and the partition 50 may be placed within the enclosed space 30 formed by the assembly of the first component 10 and the second component 20. Alternatively, the partition 50 may include an internal structure of the wire terminal protector 100. The second through-hole 51 may penetrate through both end surfaces of the partition 50. The second through-hole 51 may have a circular shape, a square shape, or a diamond shape, etc., which may not be limited by the present disclosure.

The diameter of the second through-hole 51 may be greater than the diameter of the first through-hole 40. For illustrative purposes, both the first through-hole and the second through-hole may have a circular shape as an example. When the diameter of the second through-hole 51 is 5 mm, the diameter of the first through-hole 40 may be 4.5 mm, 3 mm, 2 mm, etc. It should be noted that such numerical values may be illustrative examples for ease of understanding and may not be considered as limitations of the present disclosure.

The quantity of the second through-holes 51 may be smaller than the quantity of the first through-holes 40. The second through-hole 51 may be configured to accommodate the wire 200 and the terminal 300 into different regions of the enclosed space 30. It should be understood that the quantity of wires 200 may be greater than the quantity of the terminals 300. Each one wire 200 may correspond to one first through-hole 40, and each enclosed space 30 may correspond to one terminal 300 and one second through-hole 51. Because the quantity of wires 200 is greater than the quantity of terminals 300, the quantity of second through-holes 51 may be smaller than the quantity of first through-holes 40.

During assembly, the terminal 300 may be first placed in the first component 10, and the wire 200 may be placed in the first through-hole 40 of the first component 10. The second component 20 may be assembled with the first component 10 to accommodate the terminal 300 in the enclosed space 30, and a portion of the wire 200 may be placed in the enclosed space 30.

Referring to FIG. 1 and FIG. 2, in certain embodiments, the opening direction of the first through-hole 40 may be the same as the opening direction of the second through-hole 51.

In view of this, the wire 200 and the terminal 300 may be accommodated in the enclosed space 30, and the wire 200 may not be easily bended to create voids. In the event of combustion at the terminal 300, flames cannot propagate through the first through-hole 40 to the exterior of the wire terminal protector 100.

In one embodiment, the opening orientation may refer to the direction of the extension line of the central axis of the first through-hole 40 and the second through-hole 51.

Referring to FIG. 1 and FIG. 2, in certain embodiments, a distance between the centers of adjacent two first through-holes 40 may be greater than the diameter of the second through-hole 51.

When the distance between the centers of adjacent two first through-holes 40 is smaller than the diameter of the second through-hole 51, the wires 200 cannot be effectively separated. Consequently, when the wire 200 passes through the first through-hole 40, there may be an angle between the wire 200 and the first through-hole 40, which may cause a significant gap between the wire 200 and the first through-hole 40. Therefore, flames may propagate to the exterior of the wire terminal protector 100 through the gap in an event of combustion at the terminal 300. Through configuring the distance between the centers of adjacent two first through-holes 40 to be greater than the diameter of the second through-hole 51, the wires 200 may be effectively separated, which may prevent the formation of the significant gap when the wire 200 passes through the first through-hole 40, and may ensure the proper functionality of the wire terminal protector 100.

In one embodiment, the distance between the centers of adjacent two first through-holes 40 may be a projected distance on the plane formed by the line connecting the centers of the adjacent two first through-holes 40.

Referring to FIG. 1 and FIG. 2, in certain embodiments, the center of the second through-hole 51 may be located on the central line of the line connecting the centers of the adjacent two first through-holes 40.

In view of this, the wires 200 extended from the terminals 300 may be symmetrically separated. Compared to an asymmetric structure, the wires 200 with a symmetric structure may be less likely to create significant gaps when passing through the first through-holes 40, which may facilitate to prevent flames from propagating through such gaps to the exterior of the wire terminal protector 100 in the event of combustion at the terminal 300.

In one embodiment, the line connecting adjacent two first through-holes 40 may refer to the straight line connecting the centers of adjacent two first through-holes 40, and the line connecting the center of such straight line and the center of the second through-hole 51 may be perpendicular to the straight line.

Referring to FIG. 1 and FIG. 2, in certain embodiments, at least a portion of the partition 50 may be formed on the first component 10 or the second component 20.

In view of this, the partition 50 may divide the enclosed space 30, may reduce the burning area of flames within the wire terminal protector 100. Moreover, the second through-hole 51 on the partition 50 may be used to accommodate the wires 200.

In one embodiment, the partition 50 may be formed on the first component 10. When the first component 10 and the second component 20 are assembled, the partition 50 may abut against the second component 20. In another embodiment, the partition 50 may be formed on the second component 20. When the first component 10 and the second component 20 are assembled, the partition 50 may abut against the first component 10. In certain embodiments, the partition 50 may be simultaneously formed on both the first component 10 and the second component 20. For example, if the partition 50 has a circular shape, each of the first component 10 and the second component 20 may include a semicircular partition divided along the diameter of the partition 50. When the first component 10 and the second component 20 are assembled, the two semicircular partitions may be combined to form the partition 50.

In certain embodiments, the partition 50 may be formed by two unequal structures assembled together, which may not be limited by the present disclosure.

Figure 3:
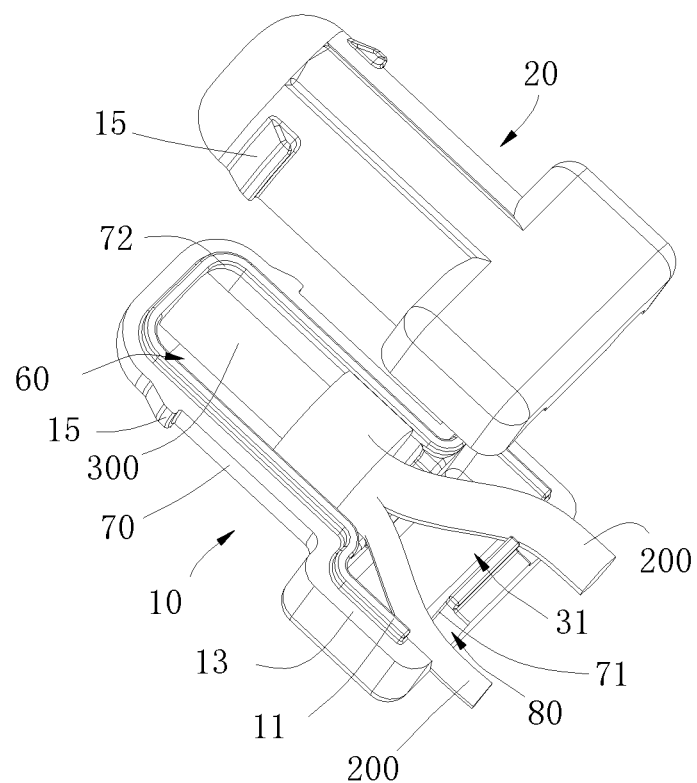
FIG. 3 illustrates an exploded view of the assembly structure in FIG. 1 consistent with disclosed embodiments of the present disclosure.

Referring to FIG. 1 and FIG. 3, in certain embodiments, the maximum projected area of the first component 10 may be the same as the maximum projected area of the second component 20.

In view of this, there may be no gap between the first component 10 and the second component 20 when being assembled, ensuring that the terminal 300 and wires 200 in the enclosed space 30 may be fully separated by the first component 10 and the second component 20. Therefore, in the event of combustion at the terminal 300, flames may not propagate to the exterior of the wire terminal protector 100.

In one embodiment, the projection of each of the first component 10 and the second component 20 may refer to the orthogonal projection of each of the first component 10 and the second component 20. The first component 10 and the second component 20 may have a symmetric structure, which may make it substantially easy to determine whether the first component 10 and the second component 20 are properly assembled. In another embodiment, the first component 10 and the second component 20 may have an asymmetric structure. For example, along the projection direction of the first component 10 and the second component 20, with respect to the second component 20, the first component 10 may further include an additional limiting structure. The limiting structure may not extend beyond the outer edge of the first component 10. Therefore, the maximum projected area of the first component 10 may remain the same as the maximum projected area of the second component 20.

Figure 4:
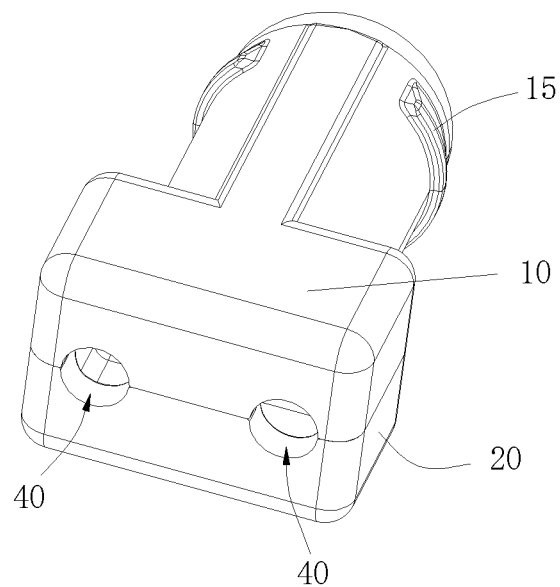
FIG. 4 illustrates a schematic diagram of an exemplary wire terminal protector consistent with disclosed embodiments of the present disclosure.

Referring to FIG. 1 and FIG. 4, in certain embodiments, one or both of the first component 10 and the second component 20 may be made of a ceramic material. In view of this, the wire terminal protector 100 may not experience functional failure.

In one embodiment, the first component 10 and the second component 20 may be attached together to form the wire terminal protector 100. The wire terminal protector 100 may have a full ceramics structure. The ceramics may possess desired fire resistance, which may ensure that the wire terminal protector 100 may not be ignited by flames. In other words, the wire terminal protector 100 may not experience functional failure. The ceramics may include common ceramics, specialty ceramics, or nano-ceramics, etc., which may not be limited by the present disclosure, as long as the ceramics meets the insulation and high-temperature resistance functions of the wire terminal protector 100 and avoids functional failure in application scenarios.

Referring to FIG. 1 and FIG. 3, in certain embodiments, both the first component 10 and the second component 20 may have grooves 60. The circumferential wall 70 forming the groove 60 may have several slots 80. When the first component 10 and the second component 20 are assembled, the grooves 60 may form the enclosed space 30, and the slots 80 may form the first through-hole 40. The enclosed space 30 may be connected to the external space through the first through-hole 40.

In view of this, the grooves 60 may define the enclosed space 30, which may allow the terminal 300 to be housed within the wire terminal protector 100. Therefore, flames may be prevented from propagating to the exterior of the wire terminal protector 100 in the event of combustion at the terminal 300. The enclosed space 30 may be connected to the external space through the first through-hole 40 formed by the slots 80. The wire 200 may be extended from the terminal 300 to the external space through the first through-hole 40 formed by the slots 80.

In one embodiment, the circumferential wall 70 may be the circumferential main body formed after the first component 10 and the second component 20 are assembled. The grooves 60 may be the groove body formed when the first component 10 and the second component 20 are not yet assembled. When the first component 10 and the second component 20 are assembled, the grooves 60 may form the enclosed space 30 under the surrounding of the circumferential walls 70. The circumferential wall 70 may include a first end wall 71 and a second end wall 72. The first end wall 71 and the second end wall 72 may be the two end faces of the circumferential wall 70 that are opposite to each other. The first end wall 71 may be the end wall on the side near the first through-hole 40, and the second end wall 72 may be the end wall on the side away from the first through-hole 40. The second end wall 72 may have a closed structure, which may prevent flames generated at the terminal 300 from propagating to the exterior of the wire terminal protector 100 through the second end wall 72. During assembly, the second end wall 72 may be configured to limit the terminal 300. The first end wall 71 may contain the first through-hole 40, and the wire 200 may pass through the first end wall 71 through the first through-hole 40.

The slot 80 may have a groove structure that penetrates through the circumferential wall 70. The slot 80 may be located on a side of the first end wall 71. The quantity of slots 80 may be more than one, and each of the first component 10 and the second component 20 may contain multiple slots 80. The multiple slots 80 may one-to-one correspond to each other and form the first through-hole 40. For illustrative purposes, each of the first component 10 and the second component 20 shown in the Figure may contain two slots 80 as an example, which may not be limited by the present disclosure.

Figure 5:
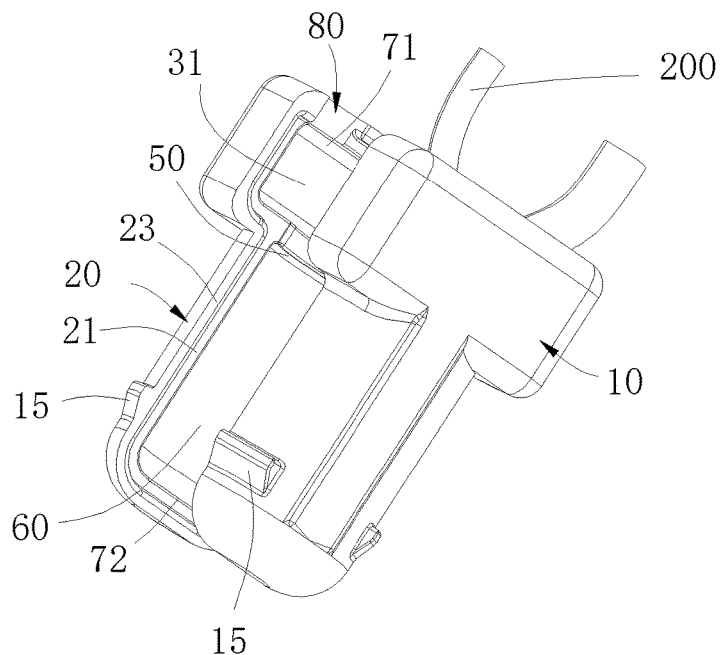
FIG. 5 illustrates another exploded view of the assembly structure in FIG. 1 consistent with disclosed embodiments of the present disclosure.

Referring to FIG. 1, FIG. 3, and FIG. 5, in certain embodiments, a sealing groove 21 may be disposed on the edge of the circumferential wall 70 of the first component 10, and a sealing strip 11 may be disposed on the edge of the circumferential wall 70 of the second component 20. The sealing strip 11 may be accommodated in the sealing groove 21.

In view of this, through disposing the sealing groove 21 on the first component 10 and the sealing strip 11 on the second component 20, the first component 10 and the second component 20 may be tightly assembled, which may prevent flames from propagating from the junction of the first component 10 and the second component 20 to the exterior of the wire terminal protector 100 in the event of combustion at the terminal 300.

In one embodiment, the first component 10 may have a first mating surface 13, and the first mating surface 13 may be located on the edge of the circumferential wall 70 of the first component 10. The second component 20 may have a second mating surface 23, and the second mating surface 23 may be located on the edge of the circumferential wall 70 of the second component 20. The first mating surface 13 and the second mating surface 23 may be the surfaces that mate with each other when the first component 10 and the second component 20 are assembled. One of the first mating surface 13 and the second mating surface 23 may have the sealing groove 21, and the other one may have the sealing strip 11. The sealing strip 11 may be accommodated in the sealing groove 21.

In one embodiment, the sealing groove 21 may be recessed into the first mating surface 13 or the second mating surface 23, and the sealing strip 11 may be protruded from the first mating surface 13 or the second mating surface 23. In the illustrated embodiment, the sealing strip 11 may be protruded from the first mating surface 13, and the sealing groove 21 may be recessed into the second mating surface 23. The sealing strip 11 may have a circular truncated cone shape, and the sealing groove 21 may also have a circular truncated cone shape. The specific shape of the sealing strip 11 and the sealing groove 21 may not be limited by the present disclosure. Sealant may be applied between the sealing strip 11 and the sealing groove 21, and the specific material of the sealant may not be restricted herein.

Referring to FIG. 1, FIG. 3, and FIG. 5, in certain embodiments, the sealing strip 11 and the sealing groove 21 may be integrally formed with the circumferential wall 70. In other words, during manufacturing the first component 10 and the second component 20, the sealing strip 11 and the circumferential wall 70 may be formed in a single processing step, and the sealing groove 21 and the circumferential wall 70 may be formed in a single processing step. In view of this, the processing and manufacturing efficiency of the first component 10 and the second component 20 may increase, and the structure may become substantially stable, which may reduce the probability of functional failure.

Figure 6:
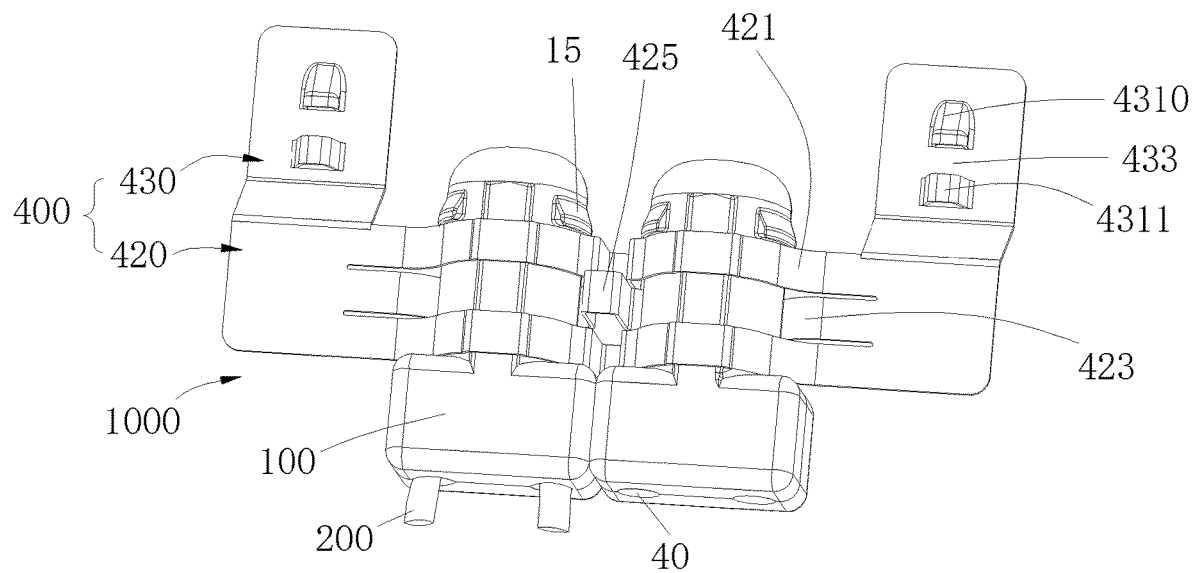
FIG. 6 illustrates a schematic diagram of an exemplary assembly of an assembly component, a wire, and a terminal consistent with disclosed embodiments of the present disclosure.

Referring to FIG. 1 and FIG. 6, the disclosed assembly 1000 may include the wire terminal protector 100 in any one of the above disclosed embodiments and a bracket 400. The wire terminal protector 100 may include a protrusion 15, and the protrusion 15 may be located on an outer surface of one or both of the first component 10 and the second component 20. The bracket 400 may include a clamping hole 410, and the protrusion 15 may be locked into the clamping hole 410.

In the disclosed assembly 1000, the wire terminal protector 100 may be directly installed on the structural component of household cooking appliance through the bracket 400. Therefore, the use of the disclosed wire terminal protector 100 may not require changing the original structural design of the household cooking appliance. Additionally, through the cooperation of the protrusion 15 and the clamping hole 410, the bracket 400 may be configured to limit the movement of the wire terminal protector 100, to facilitate the installation of the wire terminal protector 100, and to fix the wire terminal protector 100 without shaking.

In one embodiment, the bracket 400 may be made of a high-strength and high-stiffness metal material, ensuring that the wire terminal protector 100 is stably secured. The wire terminal protector 100 may be installed on the bracket 400 through a snap-fit connection or a threaded connection. The specific connection method between the bracket 400 and the wire terminal protector 100 may not be limited by the present disclosure. The bracket 400 may limit the movement of the wire terminal protector 100 through the snap-fit connection. At the same time, the bracket 400 may cooperate with the protrusion 15 located on the outer surface of one or both of the first component 10 and the second component 20 of the wire terminal protector 100 to restrict sliding of the wire terminal protector 100 with respect to the bracket 400.

In one embodiment, the protrusion 15 may be located on the outer surface of the first component 10. The protrusion 15 may be protruded from the first component 10 away from the enclosed space 30. In another embodiment, the protrusion 15 may be located on the outer surface of the second component 20. The protrusion 15 may be protruded from the second component 20 away from the enclosed space 30. In certain embodiments, a portion of the protrusion 15 may be located on the outer surface of the first component 10, and another portion of the protrusion 15 may be located on the outer surface of the second component 20. The disposure of the protrusion 15 may not be limited by the present disclosure.

A quantity of clamping holes 410 may be more than one, and the clamping holes 410 may be arranged on the bracket 400 at intervals. The quantity of clamping holes 410 may be depended on the quantity of wire terminal protectors 100. Each one clamping hole 410 may correspond to one wire terminal protector 100. The clamping holes 410 may surround the circumferential wall 70 of the wire terminal protector 100 and may fit the outer surface of the circumferential wall 70, to restrict the rotation and radial movement of the wire terminal protector 100 with respect to the bracket 400.

Figure 7:
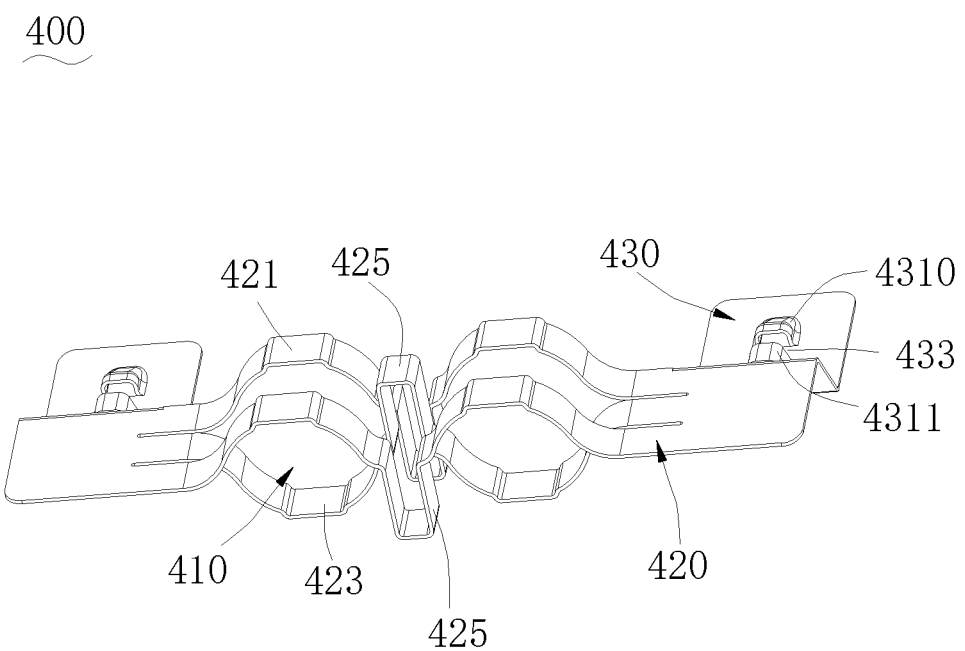
FIG. 7 illustrates a schematic diagram of an exemplary bracket consistent with disclosed embodiments of the present disclosure.

Referring to FIG. 1, FIG. 6, and FIG. 7, in certain embodiments, the bracket 400 may include a first mounting plate 420, and a second mounting plate 430 connected to the first mounting plate 420. The first mounting plate 420 may include at least two clamping strips. Adjacent clamping strips may arch in opposite directions along the thickness of the mounting plate to define the clamping holes 410. The second mounting plate 430 may be installed on the structural component of the household cooking appliance.

In view of this, the first mounting plate 420 may limit the displacement of the wire terminal protector 100 with respect to the bracket 400, and the second mounting plate 430 may secure the bracket 400 to the structural component of the household cooking appliance.

In one embodiment, the first mounting plate 420 and the second mounting plate 430 may be made from a single material using a stamping process, and both the first mounting plate 420 and the second mounting plate 430 may be made of a metal with desired elastic properties. The clamping strip may have a ring-shape, and the two clamping strips may be arranged alternately. The first clamping strip 421 may be protruded along the thickness direction of the mounting plate, and the second clamping strip 423 may be recessed along the thickness direction of the mounting plate. The middle part of the clamping strip may include a snap 425, and a quantity of the snaps may be more than one. Each one clamping strip may correspond to one snap 425.

During assembly, the snap 425 may be manually pinched to increase the diameter of the clamping hole 410, which may facilitate the installation of the wire terminal protector 100. Once the wire terminal protector 100 is inserted into the bracket 400, the snap 425 may be released. Because both the first mounting plate 420 and the second mounting plate 430 are made of metal with desired elastic properties, the diameter of the clamping hole 410 may return to the initial value, which may make the clamping hole 410 surround the circumferential wall 70 of the wire terminal protector 100 and fit the outer surface of the circumferential wall 70, and then may restrict the rotation and radial movement of the wire terminal protector 100 with respect to the bracket 400.

Furthermore, the first clamping strip 421 may cooperate with the protrusion 15 located on the outer surface of one or both of the first component 10 and the second component 20 to form a local limiting structure. One end of the first clamping strip 421 may fit the protrusion 15 to limit the axial displacement of the wire terminal protector 100 with respect to the bracket 400. The surface of the protrusion 15 fitting to the first clamping strip 421 may have a rounded edge, to prevent strong interference or assembly issues during installation.

The second mounting plate 430 may be connected to the structural component of the household cooking appliance through a threaded connection or any other suitable fixed connection method. The specific connection method between the second mounting plate 430 and the structural component of the household cooking appliance may not be limited by the present disclosure, as long as the second mounting plate 430 is capable of being stably fixed to the structural component of the household cooking appliance.

Referring to FIG. 7, in certain embodiments, two spaced protrusions 431 may be disposed on the second mounting plate 430, and a snap-fit groove 433 may be formed between the two protrusions 431. In view of this, the second mounting plate 430 may be directly mounted onto the structural component of the household cooking appliance through the protrusions 431, and the original structure of the structural component of the household cooking appliance may not need to be modified.

In one embodiment, the quantity of protrusions 431 may be more than one, and the protrusions 431 may be disposed on the second mounting plate 430 at intervals. The specific quantity of protrusions 431 may not be limited by the present disclosure. The illustrated quantity of protrusions 431 may merely be used for illustrative purposes, and may not be considered as limiting the scope of the present disclosure. The second mounting plate 430 may include a first protrusion 4310 and a second protrusion 4311, and the first protrusion 4310 and the second protrusion 4311 may be arranged at intervals. The first protrusion 4310 may be disposed at an end away from the first mounting plate 420, and the second protrusion 4311 may be disposed at an end closer to the first mounting plate 420. The first protrusion 4310 and the second protrusion 4311 may define a snap-fit groove 433, and the snap-fit groove 433 may cooperate with the structural component of the household cooking appliance to restrict the movement of the second mounting plate 430, which may make the bracket 400 be stably installed on the structural component of the household cooking appliance. The end of the first protrusion 4310 fitting to the structural component of the household cooking appliance may be chamfered, to facilitate the insertion of the structural component of the household cooking appliance into the snap-fit groove 433.

Referring to FIG. 2 and FIG. 6, the disclosed household cooking appliance may include the installation assembly 1000 in any one of the disclosed embodiments. In the household cooking appliance, the first through-hole 40 and the second through-hole 51 may allow the wires 200 to be passed through and may reduce the space of contact between the enclosed space 30 and the external environment. The enclosed space 30 may buffer the flames generated when the terminal 300 burns. Therefore, in the event of a combustion event at the terminal 300, the wire terminal protector 100 may confine the flames within the enclosed space 30, which may effectively prevent further expansion of the combustion area. Additionally, the wire terminal protector 100 may be directly installed onto the structural component of the household cooking appliance through the bracket 400. The enclosed space 30 may directly accommodate the terminal 300. Therefore, the disclosed wire terminal protector 100 may not change the original designs of the structural component and the terminal 300.

In one embodiment, the household cooking appliance may include devices such as a rice cooker, an oven, and an induction cooker. The specific type of the household cooking appliance may not be limited by the present disclosure. The household cooking appliance may include a plurality of installation assemblies 1000. The terminal 300 may be a closed-end terminal, which may not be limited by the present disclosure. The installation assembly 1000 may be installed on the structural component of the household cooking appliance that use the closed-end terminal. The wire terminal protector 100 may isolate the structural component of the household cooking appliance and the closed-end terminal, which may ensure that the structural component of the household cooking appliance may not be affected in the event of a combustion event at the closed-end terminal. Moreover, the wire terminal protector 100 may be securely installed on the structural component of the household cooking appliance through the bracket 400, which may prevent the displacement of the wire terminal protector 100 in operation.

The disclosed installation assembly 1000 may be applied to any other device that uses the terminal structure similar to the closed-end terminal as an electrical connection element. The specific applicable devices for the installation assembly 1000 may not be limited by the present disclosure.

In the descriptions of the present disclosure, terms such as "an embodiment", "certain embodiments", "exemplary embodiment", "example", "specific example", or "certain example" may refer to specific features, structures, materials, or characteristics described in conjunction with the described embodiments or examples, which are encompassed by at least one embodiment or example of the present disclosure. In the present disclosure, the indicative expressions may not necessarily refer to the same embodiment or example. Moreover, the described specific features, structures, materials, or characteristics may be combined in suitable ways in one or more embodiments or examples.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A wire terminal protector, comprising:
a first component and a second component, wherein:
the first component and the second component are assembled to form an enclosed space and to form a plurality of first through-holes that connect the enclosed space to an outside,
wherein a wire terminal is accommodated in the enclosed space, and each first through-hole of the plurality first through-holes is configured for insertion of a wire into the enclosed space,
wherein a partition is provided in the enclosed space, and the partition is provided with a second through-hole, a connection line connects centers of adjacent first through-holes of the plurality of first through-holes, and wherein a line connecting a midpoint of the connection line and a center of the second through-hole is perpendicular to the connection line.

2. The wire terminal protector according to claim 1, wherein:

a diameter of the second through-hole is greater than a diameter of each first through-hole of the plurality of first through-holes, and a quantity of the second through-hole is less than a quantity of the first through-holes.

3. The wire terminal protector according to claim 1, wherein:

an opening direction each first through-hole of the plurality of first through-holes is the same as an opening direction of the second through-hole.

4. The wire terminal protector according to claim 1, wherein:

a distance between centers of the adjacent first through-holes is greater than a diameter of the second through-hole.

5. The wire terminal protector according to claim 1, wherein:

at least a portion of the partition is formed on the first component or the second component.

6. The wire terminal protector according to claim 1, wherein:

a maximum projected area of the first component is the same as a maximum projected area of the second component.

7. The wire terminal protector according to claim 1, wherein:

at least one of the first component and the second component is made of a ceramic material.

8. The wire terminal protector according to claim 1, wherein:

the first component is provided with a first groove, the second component is provided with a second groove, a first circumferential wall forming the first groove includes first slots, and a second circumferential wall forming the second groove includes second slots.

9. The wire terminal protector according to claim 8, wherein:

when the first component and the second component are assembled, the first groove and the second groove form the enclosed space, and the first slots and the second slots form the adjacent first through-holes.

10. The wire terminal protector according to claim 8, wherein:

a sealing groove is disposed on an edge of the first circumferential wall, and a sealing strip is disposed on an edge of the second circumferential wall, wherein the sealing strip is accommodated in the sealing groove.

11. The wire terminal protector according to claim 10, wherein:

the sealing strip is integrally formed with the second circumferential wall and the sealing groove is integrally formed with the first circumferential wall.

12. An assembly component, comprising:

a wire terminal protector, the wire terminal protector including:

a first component and a second component, wherein:

the first component and the second component are assembled to form an enclosed space and to form a plurality of first through-holes that connect the enclosed space to an outside, wherein a wire terminal is accommodated in the enclosed space, and each first through-hole of the plurality of first through-holes is configured for insertion of a wire into the enclosed space, and a protrusion, wherein the protrusion is located on an outer surface of the at least one of the first component and the second component; and a bracket, wherein the bracket includes a clamping hole, and the protrusion is locked into the clamping hole, wherein the bracket includes a first mounting plate, and a second mounting plate connected to the first mounting plate, wherein the first mounting plate includes at least two clamping strips, two adjacent clamping strips of the at least two clamping strips arch in opposite directions along a thickness direction of the first mounting plate to define the clamping hole, and the second mounting plate is installed on a structural component of a household cooking appliance.

13. The assembly component according to claim 12, wherein:

a partition is provided in the enclosed space, and the partition is provided with a second through-hole.

14. The assembly component according to claim 13, wherein:

a diameter of the second through-hole is greater than a diameter of each first through-hole of the plurality of first through-holes, and a quantity of the second through-hole is less than a quantity of the first through-holes.

15. The assembly component according to claim 12, wherein:

the protrusion is a third protrusion, and wherein a first protrusion and a second protrusion, which are different from the third protrusion, are disposed on the second mounting plate, wherein a snap-fit groove is formed between the first protrusion and the second protrusion.

16. A household cooking appliance, comprising:

an assembly component, the assembly component including:

a wire terminal protector, the wire terminal protector including:

a first component and a second component, wherein:

the first component and the second component are assembled to form an enclosed space and to form a plurality of first through-holes that connect the enclosed space to an outside, wherein a wire terminal is accommodated in the enclosed space, and each first through-hole of the plurality of first through-holes is configured for insertion of a wire into the enclosed space, and a protrusion, wherein the protrusion is located on an outer surface of the first component and/or the second component; and a bracket, wherein the bracket includes a clamping hole, and the protrusion is locked into the clamping hole, wherein the bracket includes a first mounting plate, and a second mounting plate connected to the first mounting plate, wherein the first mounting plate includes at least two clamping strips, two adjacent clamping strips of the at least two clamping strips arch in opposite directions along a thickness direction of the first mounting plate to define the clamping hole, and the second mounting plate is installed on a structural component of the household cooking appliance.

17. The assembly component according to claim 16, wherein:
   a partition is provided in the enclosed space, and the partition is provided with a second through-hole, wherein a diameter of the second through-hole is greater than a diameter of each first through-hole of the plurality of first through-holes, and a quantity of the second through-hole is less than a quantity of the first through-holes.

* * * * *